United States Patent [19]

Munier et al.

[11] Patent Number: 4,609,824

[45] Date of Patent: Sep. 2, 1986

[54] PHOTOSENSITIVE DEVICE FOR THE INFRARED RANGE

[75] Inventors: Bernard Munier, Seyssinet Pariset; Marc Arques, Grenoble, both of France

[73] Assignee: Thomson-CSF, Paris, France

[21] Appl. No.: 670,409

[22] Filed: Nov. 9, 1984

[30] Foreign Application Priority Data

Nov. 15, 1983 [FR] France ............................. 83 18125

[51] Int. Cl.$^4$ ............................................. H01J 40/14
[52] U.S. Cl. ................................ 250/578; 250/211 J; 358/213
[58] Field of Search ............... 250/211 J, 238, 578, 250/352, 370 L; 357/32; 358/213

[56] References Cited

U.S. PATENT DOCUMENTS 4,496,980 1/1985 Pfleider et al. ................. 358/213 X

OTHER PUBLICATIONS

Electronics Letters, vol. 18, No. 7, Apr. 1982, (Londres, GB) R.A. Ballingall et al.: "Electronically scanned CMT detector ...".

Microelectronics Journal, vol. 10, No. 1, May–Jun. 1979, Mackintosh Publ. Ltd. (Luton, US) C. Tassell et al.: "Photodiode Arrays–Characteristics ...".

Primary Examiner—Eugene R. Laroche
Assistant Examiner—James C. Lee
Attorney, Agent, or Firm—Roland Plottel

[57] ABSTRACT

A photosensitive device for the infrared range wherein each detector is connected to a first and a second MOS transistor. The second MOS transistors are addressed, column by column, by a first shift register. The first MOS transistors are connected, line by line, to a charge storage capacity and to a third charge reading MOS transistor addressed by a second shift register. The whole of the device is placed in a cryostat which only has a single output.

4 Claims, 5 Drawing Figures

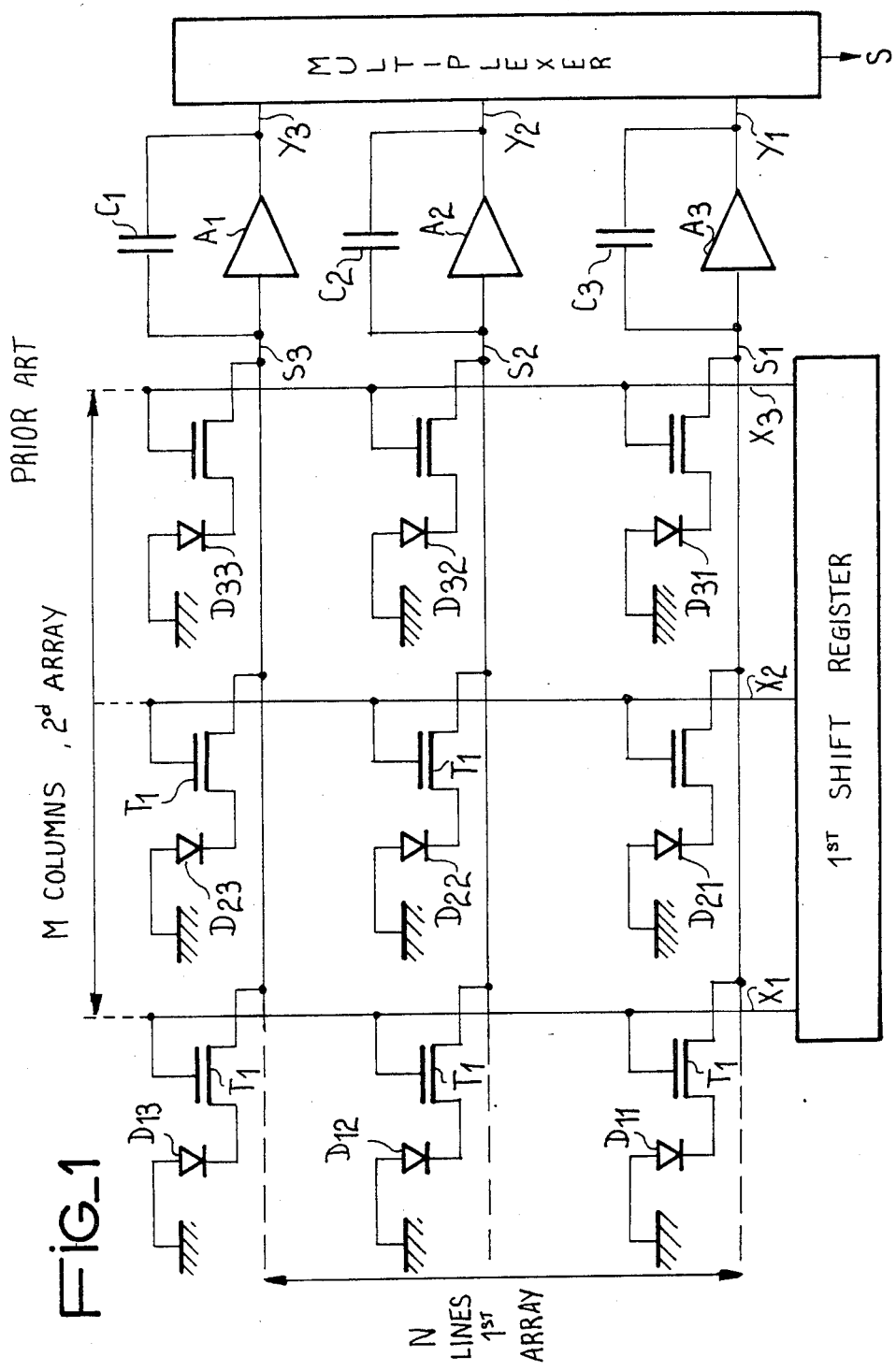

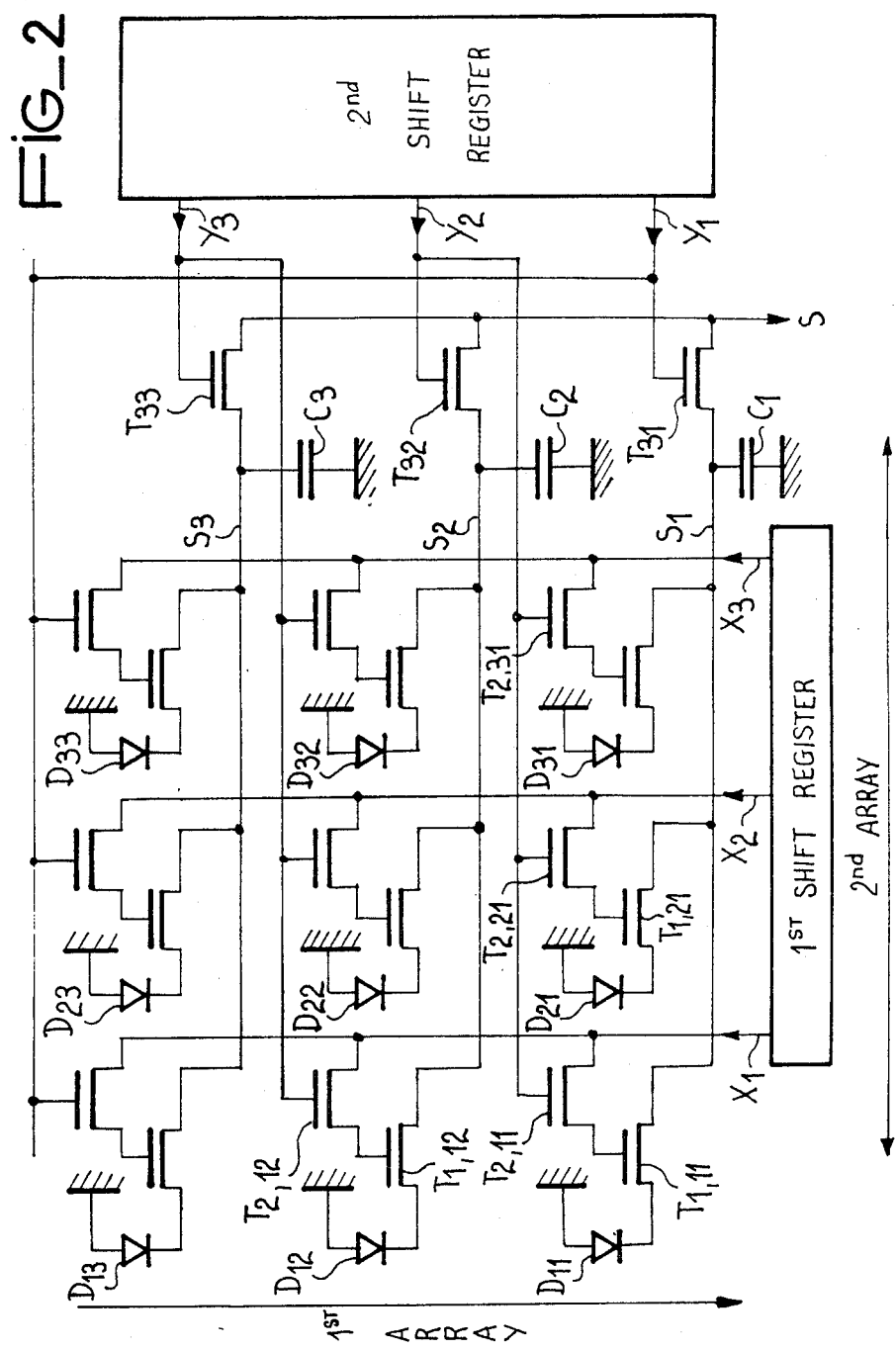

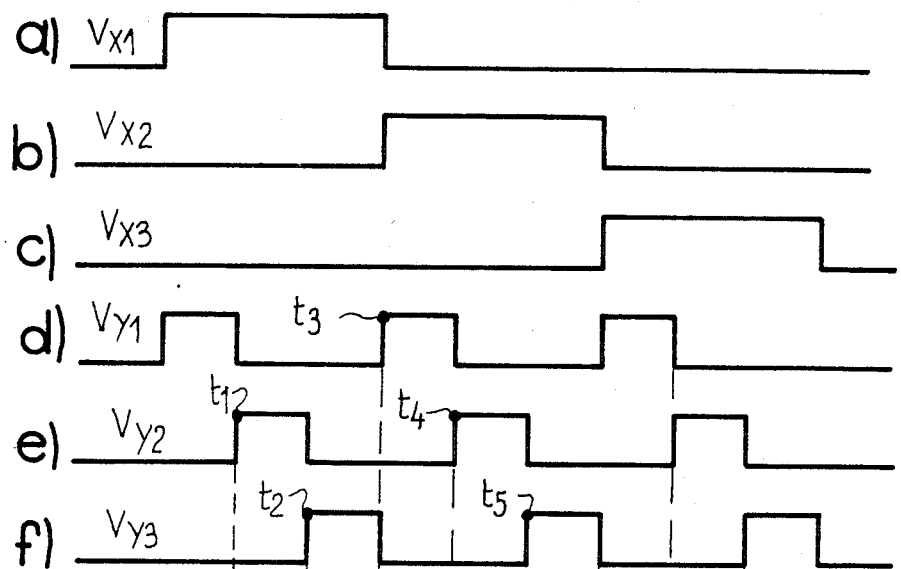
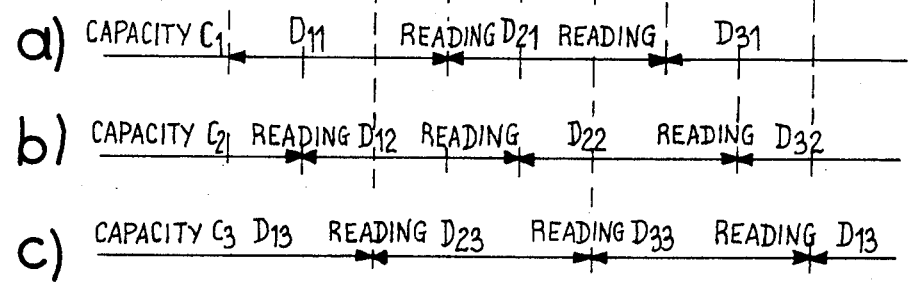

FIG_5
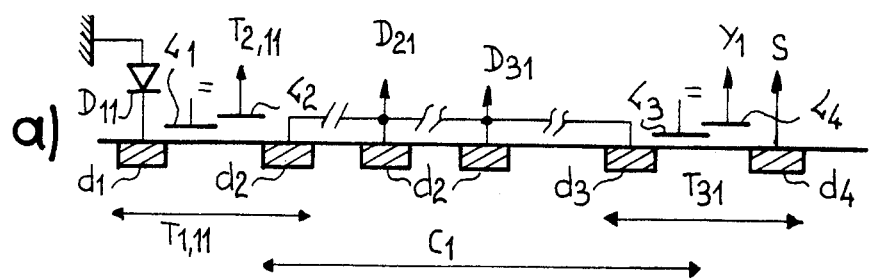
a)
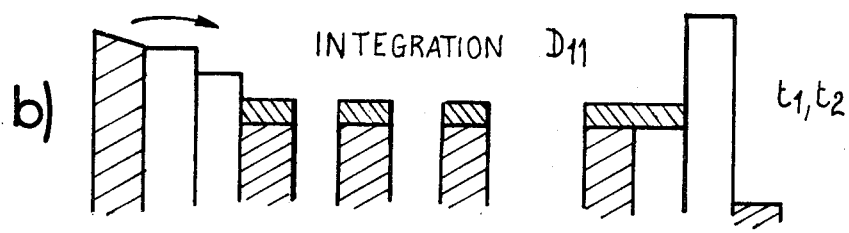
b) INTEGRATION $D_{11}$ $t_1, t_2$
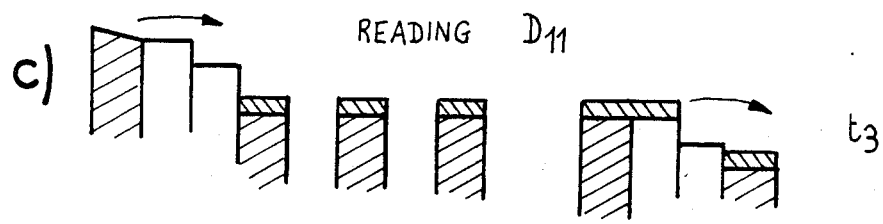
c) READING $D_{11}$ $t_3$
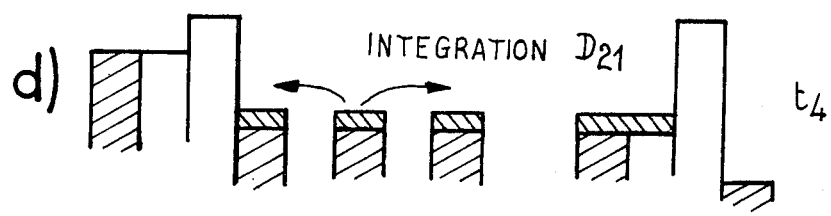
d) INTEGRATION $D_{21}$ $t_4$

PHOTOSENSITIVE DEVICE FOR THE INFRARED RANGE

BACKGROUND OF THE INVENTION

1. Field of the Invention

The present invention relates to a photosensitive device for the infrared range.

2. Description of the Prior Art

In the article entitled "Electronically Scanned C.M.T. detector array for the 8-14 micrometer band", published in the review "Electronics Letters", of the Apr. 1, 1982, vol. 18, No. 7, pages 285-287, a photosensitive device for the infrared range is known which will be described with reference to FIG. 1 accompanying the present description.

This device comprises an array of N lines and M columns of infrared detectors integrated on a semiconductor substrate. In FIG. 1, M=N=3, by way of example. The detectors $D_{11}$, $D_{21}$, $D_{31}$ ..., $D_{12}$, $D_{22}$, $D_{32}$ .. are photodiodes, integrated on cadmium, mercury and telluride (C.M.T) semiconductor substrate, each photodiode being associated with an MOS transistors $T_1$. In FIG. 1, the anode of each photodiode is connected to groud and its cathode to MOS transistor $T_1$. A first array of horizontal electrodes connects together the MOS transistors $T_1$ associated with the detectors of the same line. A second array of vertical electrodes connects together the gates of the MOS transistors $T_1$ associated with the detectors in the same column. A first shift register allows each electrode of the second array to be addressed successively. When an electrode of the second array is addressed, there is integration of the charges corresponding to the infrared radiation, received by the detectors connected to this electrode, for example detectors $D_{11}$, $D_{12}$, $D_{13}$ in FIG. 1. The integration and reading of the charges is provided by operational amplifiers connected as integrators, with a capacity $C_1$, $C_2$, $C_3$ between their negative input and their output, and which are connected to each electrode of the first array. A multiplexer receives the outputs of the amplifiers and supplies a series reading signal S of the charges integrated in the detectors of a column. The integration of the charges of detectors $D_{21}$, $D_{22}$, $D_{23}$ of the next column then begins.

The first MOS transistors $T_1$ as well as the first shift register are integrated on a silicon semiconductor substrate which is interconnected with the substrate bearing the infrared detectors. The first MOS transistors $T_1$ and the first shift register are placed in the same cryostat brought to 77K as the infra red detectors.

The problem which arises, and which the present invention resolves, is that operational amplifiers connected as integrators cannot be placed inside the cryostat. Since their consumption, and so their temperature, are high, putting them in the cryostat would raise difficulties. In addition, because of this high consumption, they are constructed as discrete components and are space consuming.

The consequence is that numerous connections must be formed between the cryostat and the rest of the device. In addition, the connections between the cryostat and the operational amplifiers convey low level signals sensitive to parasites.

SUMMARY OF THE INVENTION

The present invention overcomes this problem. It provides a photosensitive device for the infrared range having an operation comparable to that of the device described in the above mentioned article, but in which the cryostat only comprises a single output, with high voltage level and low impedance.

According to claim 1, the present invention relates to a photosensitive device for the infrared range comprising:

an array of N lines and M columns of infrared detectors integrated on a first semiconductor substrate and two arrays of electrodes, one of the arrays being assigned to the detectors of the same line and the other to the detectors of the same column;

a first MOS transistor connected between each detector and an electrode of a first network;

a first shift register which addresses one after the other the electrodes of a second network, the first MOS transistors and the first register being integrated on a second semiconductor substrate and placed in a cryostat with the detectors, said device further comprising, integrated in the second semiconductor substrate and placed in the cryostat:

a second MOS transistor connected between the gate of each first MOS transistor and an electrode of the second array;

a capacitor connected between each electrode of the first array and a reference potential for successively storing then reading the charges due to the detectors connected to this electrode;

a third MOS transistor connected between each electrode of the first array and the output of the photosensitive device and which allows the charges stored in each capacity to be read;

a second shift register which, whereas the first register addresses one electrode of the second array, addresses one after the other, the gate of the third MOS transistors connected to an electrode of the first array, as well as the gates of the second MOS transistor controlling the gates of the first MOS transistors connected to another electrode of the first array, which allows all the detectors connected to each electrode of the second array to be read one after the other and the charges coming from a detector connected to each of the other electrodes of the first array to be integrated when a detector connected to an electrode of the first array is read.

BRIEF DESCRIPTION OF THE DRAWINGS

Other objects, features and results of the invention will be clear from the following description, given by way of non limitative example and illustrated by the accompanying Figures which show:

FIG. 1, the diagram of a photosensitive device for the infrared range of the prior art;

FIG. 2, the diagram of one embodiment of a photosensitive device for the infrared range in accordance with the invention;

FIGS. 3a to f, an example of the wave form of the control signals of the device of the invention;

FIGS. 4a, b, c diagrams showing the succession of integration and reading phases in the case of a device of the invention comprising three lines and three columns of detectors;

FIGS. 5a to d, a cross sectional view of one embodiment of the device of the invention and diagrams explaining operation thereof.

In the different Figures, the same references designate the same elements but, for the sake of clarity, the sizes and proportions of the different elements have not been respected.

DESCRIPTION OF THE PREFERRED EMBODIMENTS

FIG. 1 has been described in the introduction to the description.

FIG. 2 shows the diagram of one embodiment of a photosensitive device for the infrared range in accordance with the invention.

This device differs particularly from that of FIG. 1 for two MOS transistors are associated with each detector $D_{11}, D_{12}, D_{13} \ldots$:

as in FIG. 1, a first MOS transistor $T_{1,11}, T_{1,21} \ldots$ is connected between each detector and a horizontal electrode of a first electrode array;

a second MOS transistor $T_{2,11}, T_{2,21} \ldots$ is connected between the gate of each first MOS transistor and a vertical electrode of a second electrode array.

As in FIG. 1, a first shift register addresses the vertical electrodes of the second array one after the other.

Another differennce between the device of FIG. 1 and that of FIG. 2 concerns the means for integrating and reading the charges connected to the horizontal electrodes $S_1, S_2, S_3$ of the first array.

In FIG. 2, these means are formed by:

a capacitor $C_1, C_2, C_3 \ldots$ connected between each horizontal electrode $S_1, S_2, S_3$ of the first array and a reference potential, which may be the potential of the second semiconductor substrate and which is shown symbolically in the Figures by ground;

a third MOS transistor $T_{31}, T_{32}, T_{33} \ldots$ connected between each horizontal electrode $S_1, S_2, S_3$ of the first array and the output S of the photosensitive device;

a second shift register which addresses, one after the other, the gate of a third MOS transistor, as well as the gates of the second MOS transistors controlling the gates of the first MOS transistors connected to an electrode of the first array other than the one to which said third MOS transistor is connected.

In the rest of the description, it will be assumed that:

the first and second shift registers address successively electrodes of rank i, i+1, i+2 ...

the second shift register addresses the gate of the third MOS transistor connected to the electrode of rank i+1 of the first array and simultaneously the gates of the second MOS transistors controlling the gates of the first MOS transistors connected to the electrode of rank i of the first array.

Thus, for example, in FIG. 2 the output $Y_2$ of the second register is connected to the gate of transistor $T_{32}$ and to the gates of transistors $T_{2,11}$-$T_{2,21}$-$T_{2,31}$. The same connections are provided for the other outputs of the second register.

The device of the invention may of course be modified so that the lines and columns of detectors are addressed in another object.

A great advantage of the device of the invention is that the whole of the device may be placed in a cryostat, the infrared detectors being integrated on a first semiconductor substrate interconnected to a second semiconductor substrate on which the rest of the device is integrated. A single high level output S leaves the cryostat.

The operation of the device shown in FIG. 2 differs from that of the device of the prior art.

This operation will be described with reference to FIGS. 3a to f and 4a, b, c.

FIGS. 3a to f show the voltages $V_{X1}, V_{X2}, V_{X3}$ and $V_{Y1}, V_{Y2}, V_{Y3}$ taken at the outputs $X_1, X_2, X_3, Y_1, Y_2, Y_3$ of the first and second shift registers.

Each voltage $V_{X1}, V_{X2}, V_{X3}$ passes in its turn to the high level, first of all $V_{X1}$, then $V_{X2}, V_{X3} \ldots$ The voltages $V_{Y1}, V_{Y2}, V_{Y3}$ each pass in their turn to the high level for each period of time when one of the voltages $V_{X1}, V_{X2}, V_{X3}$ is at the high level. In FIGS. 3a to f, one of the voltages $V_{X1}, V_{X2}, V_{X3}$ and one of the voltages $V_{Y1}, V_{Y2}, V_{Y3}$ are always at the high level.

At time $t_1$, the voltages $V_{X1}$ and $V_{Y2}$ are at the high level and the other voltages at the low level. The second MOS transistor $T_{2,11}$ is enabled and enables the first MOS transistor $T_{1,11}$. The charges from detector $D_{11}$ are stored in capacity $C_1$. At the same time as integration of the charges from detector $D_{11}$ begins, the third transistor $T_{32}$ is enabled and reads the charges stored in capacity $C_2$ coming from detector $D_{32}$.

At time $t_2$, the voltages $V_{X1}$ and $V_{Y3}$ are at the high level. The MOS transistor $T_{2,11}$ which receives at its gate the low level voltage $V_{Y2}$ is disabled. Transistor $T_{1,11}$ continues however to conduct because of the charges previously accumulated at its gate. The fact that the whole of the photosensitive device is placed in a cryostat brought to a low temperature promotes maintenance of the charges on the gate of transistor $T_{1,11}$. The integration of the charges from detector $D_{11}$ continues. Transistors $T_{2,12}$ and $T_{1,12}$ conduct and cause integration of the charges from detector $D_{12}$ in capacity $C_2$. Transistor $T_{32}$ is disabled. The reading of the charges from $D_{32}$ is finished. Transistor $T_{33}$ conducts and causes the charges to be read which come from detector $D_{13}$ and are accumulated in capacity $C_3$.

A time $t_3$, the voltages $V_{X2}$ and $V_{Y1}$ are at the high level. Transistor $T_{2,11}$ is disabled, but transistor $T_{1,11}$ continues to conduct. Integration of the charges coming from detector $D_{11}$ continues. The same goes for integration of the charges from detector $D_{12}$. The MOS transistor $T_{33}$ is diabled and reading of the charges from detector $D_{13}$ is finished. On the other hand, transistor $T_{31}$ conducts and reads the charges coming from detector $D_{11}$ and stored in capacity $C_1$. The transistors $T_{2,23}$ and $T_{1,23}$ conduct and integration of the charges from detector $D_{23}$ in capacity $C_3$ begins.

At time $t_4$, the voltages $V_{X2}$ and $V_{Y2}$ are at the high level. The MOS transistor $T_{31}$ is disabled, which stops reading of the charges coming from detector $D_{11}$ and stored in capacity $C_1$. The voltage $V_{Y2}$ going over to the high level whereas $V_{X1}$ is at the low level causes transistors $T_{2,11}$ and $T_{1,11}$ to be disabled and stops the integration of the charges from detector $D_{11}$. Reading of the charges from detector $D_{12}$ begins while the integration of the charges from this detector continues. Integration of the charges from detector $D_{23}$ continues whereas integration of the charges coming from detector $D_{21}$ begins.

The operation of the device of FIG. 2 is based on the following considerations in which transistors $T_{1,11}$ and $T_{2,11}$ are taken as examples:

when the voltages $V_{X1}$ and $V_{Y2}$ are at the high level, the MOS transistors $T_{2,11}$ and $T_{1,11}$ are conducting;

when $V_{X1}$ is at the high level and $V_{Y2}$ at the low level transistor $T_{2,11}$ is disabled but transistor $T_{1,11}$ continues to conduct because of the charges accumulated at its gate;

when $V_{X1}$ is at the low level and $V_{Y2}$ at the high level, transistors $T_{2,11}$ and $T_{1,11}$ are disabled.

In FIGS. 4a, b, c there is shown how integration and reading of detectors through capacity $C_1$, $C_2$, and $C_3$ are spaced apart in time.

It can be seen that the detectors connected to each electrode of a second array are read successively.

Thus, the detectors $D_{13}$, $D_{11}$, $D_{12}$ are read, then $D_{23}$, $D_{21}$, $D_{22}$, $D_{33}$, $D_{31}$, $D_{32}$ and again $D_{13}$, $D_{11}$, $D_{12}$ ...

It can be seen that, while a detector connected to a horizontal electrode is read, the integration take place of the charges coming from a detector connected to each of the other horizontal electrodes. Thus, while $D_{11}$ is read the charges from $D_{12}$ and $D_{23}$ are integrated.

Contrary to what happens with the device of FIG. 1, the periods of integration of the detectors are staggered in time.

An advantage of the device of the invention is that it comprises only a single capacity per line (or column) of detectors, while allowing high charge integration times. It can be seen from FIG. 4 that integration of the charges from $D_{11}$ takes place from $t_1$ to $t_4$, whereas with the device of FIG. 1 this integration would only take place during a time equal to $t_2 - t_1$.

FIG. 5a is a cross sectional view through the semiconductor substrate, made from P type silicon for example, on which the device for FIG. 2 is integrated.

This section has been made at the level of the elements connected to the photodiode $D_{11}$.

This photodiode $D_{11}$ has its anode connected to a reference potential shown symbolically in the Figure by ground and its cathode connected to the first MOS transistor $T_{1,11}$ formed by two diodes $d_1$ and $d_2$ and two gates $G_1$ and $G_2$.

The first gate $G_1$ is brought to a constant potential and contributes to biasing the photodiode.

The second gate $G_2$ is controlled by the second MOS transistor $T_{2,11}$ which is not shown in FIG. 5a.

An electrode connects together the diodes $d_2$ of the first transistors $T_{1,11}$, $T_{1,21}$, $T_{1,31}$ of the first line of detectors $D_{11}$, $D_{21}$, $D_{31}$.

This electrode $S_1$ ends at a diode $d_3$ which forms part of the third MOS transistor $T_{31}$. This transistor comprises two gates, a gate $G_3$ at a constant potential and a gate $G_4$ which is connected to the output $Y_1$ of the second shift register. The MOS transistor $T_3$ also comprises a diode $d_4$ connected to the output S of the device.

The capacity $C_1$ is formed by the capacities of all the diodes $d_2$ of the line of detectors, by the capacity of diode $d_3$ and of the gate $g_3$ of transistor $T_{31}$.

FIGS. 5b, c and d show the evolution of the surface potentials in the semiconductor substrate during time.

In FIG. 5b, at times $t_1$ and $t_2$ integration takes place in capacity $C_1$ of the charges due to detector $D_{11}$.

In FIG. 5c, at time $t_3$, the charges stored in capacity $C_1$ are read by transistor $T_{31}$.

In FIG. 5d, at time $t_4$, the capacity $C_1$ stores the charges from detector $D_{21}$.

The infrared sensitive detectors may be photodiodes as in the Figures or another type of infrared detector, such for example as a detector of the gate-insulation-semiconductor type. In the case of photodiodes, they may be connected either to a diode formed on the second semiconductor substrate, as in the Figures, or to a gate formed on this second substrate without the operation of the device of the invention being modified. The photodiodes may for example be connected to a gate of a first MOS transistor having at least one other gate connected to a second MOS transistor.

Similarly, the photodetectors and the rest of the device are integrated on different and well matched semiconductor substrates. For example, for the photodetectors, indium antimonide, tin and lead telluride, cadmium and mercury telluride ... The rest of the device is integrated for example on a P or N type silicon semiconductor substrate.

Finally, the roles of the electrodes of the first and second electrode arrays may of course be reversed without any problem, that is to say that the first shift register may be connected to the electrodes of the first array and the capacities, the third MOS transistors and the second shift register may be connected to the electrodes of the second array.

In the present description, it is for example the passage of voltages $V_{Y1}$, $V_{Y2}$, $V_{Y3}$ to the high level which causes transistors $T_{31}$, $T_{32}$, $T_{33}$ to conduct. When the device is integrated on an N type substrate, it is of course the passage to the low level of the control signals which causes conduction.

What is claimed is:

1. A photosensitive device for the infrared range comprising:
    an array of N lines and M columns of infrared detectors integrated on a first semiconductor substrate and two electrode arrays, one of the arrays being assigned to the detectors of the same line and the other to the detectors of the same column;
    a first MOS transistor connected between each detector and an electrode of the first array;
    a first shift register which addresses one after the other the electrodes of the second array, the first MOS transistors and the first register being integrated on a second semiconductor substrate and placed in a cryostat with the detectors, said device further comprising, integrated in the second semiconductor substrate and placed in the cryostat:
    a second MOS transistor connected between a gate of each first MOS transistor and an electrode of said second array;
    a capacitor, connected between each electrode of the first array and a reference potential, said capacitor serving successively for storing then reading the charges due to the detectors connected to this electrode;
    a third MOS transistor connected between each electrode of the first array and the output of the photosensitive device and which allows the charges to be read which are stored in each capacitor;
    a second shift register which, when the first register addresses an electrode of the second array, addresses one after the other, the gate of the third MOS transistors connected to an electrode of the first array, as well as the gates of the second MOS transistors controlling the gates of the first MOS transistors connected to another electrode of the first array, which allows all the detectors connected to each electrode of the second array to be read successively and the charges coming from a detector connected to each of the other electrodes of the first array to be integrated when a detector connected to an electrode of the first array is read.

2. The device as claimed in claim 1, wherein the infrared detectors are photodiodes.

3. The device as claimed in claim 1, wherein
    the first and second shift registers address successively the electrodes of rank 1, 2, 3 ... i, i+1, i+2 ... then again 1, 2, 3, ...;

the second shift register addresses the gate of the third MOS transistor connected to the electrode of rank $i+1$ of the first array and the gates of the second MOS transistors controlling the gates of the first MOS transistors connected to the electrode of rank i of the first array.

4. Device as claimed in claim 2, wherein:

the first and second shift registers address successively the electrodes of rank $1, 2, 3 \ldots i, i+1, i+2 \ldots$ then again $1, 2, 3 \ldots$;

the second shift register addresses the gate of the third MOS transistor connected to the electrode of rank $i+1$ of the first array and the gates of the second MOS transistors controlling the gates of the first MOS transistors connected to the electrode of rank i of the first array.

* * * * *